United States Patent
Garin et al.

(10) Patent No.: US 7,142,157 B2
(45) Date of Patent: Nov. 28, 2006

(54) DETERMINING POSITION WITHOUT USE OF BROADCAST EPHEMERIS INFORMATION

(75) Inventors: Lionel J. Garin, Palo Alto, CA (US); Makarand S. Phatak, Sunnyvale, CA (US)

(73) Assignee: SIRF Technology, Inc., San Jose, CA (US)

( * ) Notice: Subject to any disclaimer, the term of this patent is extended or adjusted under 35 U.S.C. 154(b) by 0 days.

(21) Appl. No.: 10/941,251

(22) Filed: Sep. 14, 2004

(65) Prior Publication Data

US 2006/0055598 A1    Mar. 16, 2006

(51) Int. Cl.
*H04B 7/185* (2006.01)
*G01S 5/02* (2006.01)

(52) U.S. Cl. .............................. 342/357.15; 342/357.06
(58) Field of Classification Search ........... 342/357.01, 342/357.06, 357.1, 357.15; 701/207, 213, 701/215
See application file for complete search history.

(56) References Cited

U.S. PATENT DOCUMENTS

| | | | |
|---|---|---|---|
| 5,590,395 A * | 12/1996 | Diekelman | 455/13.1 |
| 6,072,430 A * | 6/2000 | Wyrwas et al. | 342/357.1 |
| 6,211,819 B1 * | 4/2001 | King et al. | 342/357.09 |
| 6,542,820 B1 | 4/2003 | LaMance et al. | |
| 6,560,534 B1 | 5/2003 | Abraham et al. | |
| 6,567,645 B1 * | 5/2003 | Wiedeman et al. | 455/12.1 |
| 2002/0163940 A1 * | 11/2002 | Lee et al. | 370/508 |
| 2003/0011513 A1 * | 1/2003 | Zhao et al. | 342/357.09 |

OTHER PUBLICATIONS

Bob E. Schutz, "GPS Orbit Prediction" (Center for Space Research University of Texas at Austin), Dec. 11, 2003.
Bob E. Schutz, "GPS Orbit Evolution: 1998-2000" (AIAA/AAS Astrodynamics Specialist Conference), Aug. 14-17, 2000 in Denver.

* cited by examiner

*Primary Examiner*—Dao Phan
(74) *Attorney, Agent, or Firm*—Jonathan W. Hallman; MacPherson Kwok Chen & Heid LLP

(57) ABSTRACT

Devices and methods are described for determining position information without broadcast ephemeris data for extended time periods. A server or client device receives or collects historical state data of satellites of a satellite-based positioning system and generates predictions of future satellite trajectories for future time periods. When a server generates the predictions, the predictions are subsequently transferred to a client device. The client device selects predictions appropriate to time of interest. The time can be any time during a period of at least seven calendar days. The client device reconstructs satellite states using information on the predictions and uses the reconstructed satellite states to acquire satellite signals as appropriate to the current location and time of the client device. The client device determines and/or tracks its position using information of the satellite states and timing information of the satellite signals.

24 Claims, 4 Drawing Sheets

DETERMINING POSITION WITHOUT USE OF BROADCAST EPHEMERIS INFORMATION

FIELD OF INVENTION

The disclosed embodiments relate to satellite based positioning systems and methods. More particularly, the disclosed embodiments relate to determining position without the use of ephemeris information in its broadcast form.

BACKGROUND

Satellite-based positioning systems include constellations of earth orbiting satellites that constantly transmit orbit information and ranging signals to receivers. An example of a satellite-based positioning system is the Global Positioning System (GPS), which includes a constellation of earth orbiting satellites, also referred to as GPS satellites, satellite vehicles, or space vehicles. The GPS satellites circle the earth twice a day in a very precise orbit and transmit signal information to the earth. The satellite signal information is received by GPS receivers which can be in portable or mobile units, or in fixed positions on base stations and/or servers.

The GPS receiver uses the satellite signal information to calculate the receiver's precise location. Generally the GPS receiver compares the time GPS signals or satellite signals were transmitted by a satellite with the time of receipt of that signal at the receiver. This time difference between satellite signal reception and transmission provides the receiver with information as to the range of the receiver from the transmitting satellite. Using pseudo-range measurements (pseudo because the range information is offset by an amount proportional to the offset between GPS satellite clock and receiver clock) from a number of additional satellites, the receiver can determine its position. The GPS receiver uses received signals from at least four satellites to calculate three-dimensional position (latitude, longitude, and altitude), or at least three satellites to calculate two-dimensional position (if altitude is known).

As GPS technology becomes more economical and compact it is becoming ever more common in consumer applications. For example, GPS systems are used for navigation in general aviation and commercial aircraft as well as by professional and recreational boaters. Other popular consumer uses of GPS include use in automobile navigation systems, construction equipment, and farm machinery as well as use by hikers, mountain bikers, and skiers, to name a few. Further, many location-based services are now available, such as asset tracking, turn-by-turn routing, and friend finding. Because GPS technology has so many consumer applications, it is finding increased popularity as an additional application hosted by a variety of portable electronic devices like personal digital assistants (PDAs), cellular telephones, and personal computers (PCs), to name a few. The popularity of GPS technology with consumers has resulted in an increased reliance on the position information provided to the consumer by GPS which, in turn, has resulted in a desire for GPS systems that provide reliable position information even when the GPS system is operating under less-than-ideal conditions.

The GPS satellite signals travel by line of sight, meaning they will pass through clouds, glass and plastic but will not get through most solid objects such as buildings and mountains. Generally, then, GPS receivers are usable everywhere except where it is impossible to receive an adequate satellite signal such as inside some buildings, in caves and other subterranean locations, and underwater. A GPS receiver, when determining position information, typically relies on information from the satellite signal, the absence of which makes position determination impossible. This satellite signal information includes a pseudorandom code along with ephemeris and almanac data to the receivers. The pseudorandom code is a code that identifies the satellite that is transmitting the corresponding signal and also helps the receiver to make ranging measurements. The almanac data tells the GPS receiver where each GPS satellite of the constellation should be at any time over a wide time interval that spans a few days or weeks. The ephemeris data does the same thing but much more accurately though over a much shorter time interval of a few hours.

The broadcast ephemeris data, which is continuously transmitted by each satellite, contains important information about the orbit of the satellite, and time of validity of this orbit information. In particular, the broadcast ephemeris data of a GPS satellite predicts the satellite's state over a future interval of approximately four hours. The state prediction includes predictions of satellite position, velocity, clock bias, and clock drift. More particularly, the broadcast ephemeris data describe a Keplerian element ellipse with additional corrections that then allow the satellite's position to be calculated in an Earth-centered, Earth-fixed (ECEF) set of rectangular coordinates at any time during the period of validity of the broadcast ephemeris data. Typically, the broadcast ephemeris data is essential for determining a position.

Considering that the broadcast ephemeris data is only valid for a four hour interval and is essential for position determination, a GPS receiver is required to collect new broadcast ephemeris data at such time as the receiver needs to compute the satellite state when the validity time for the previously-collected broadcast ephemeris data has expired. The new broadcast ephemeris data can be collected either as direct broadcast from a GPS satellite or re-transmitted from a server. However, there are situations under which it is not possible to collect new broadcast ephemeris data from GPS satellites or from a server. As an example of situations in which new broadcast ephemeris data cannot be collected, a low signal strength of the satellite signals can prevent decoding/demodulating of the ephemeris data from the received satellite signal, the client can be out of coverage range of the server, and/or the server can be unavailable for a number of reasons, to name a few. When new broadcast ephemeris data is not available, the GPS receiver is typically unable to provide position information.

Furthermore, even when the GPS receiver is in a position from which it can receive the broadcast ephemeris information from a GPS satellite and/or server and properly decode the signal, the process of receiving and decoding adds substantially to the processing time. This additional processing time directly increases the time-to-first-fix (TTFF) while increasing the power usage of the receiver. Both an increase in the TTFF and the power usage can be unacceptable to a user depending on the use being made of the receiver and power capabilities of the receiver (for example, a GPS receiver hosted on a client device like a cellular telephone would have stricter power use constraints). As a result of the increased use of GPS in consumer devices, and the increased reliance on the information provided by such devices, it is desirable to reduce the number of situations in which the GPS receiver cannot provide position information and/or cannot provide position in a time and power efficient manner.

SUMMARY

In accordance with an aspect of the invention, a portable communications device is provided that includes: a first communication system that receives data representative of predicted satellite states via a first communication link, wherein the predicted satellite states are continuously generated for future time periods using historical satellite state data for at least one satellite of a satellite-based positioning system; a prediction generator that selectively reconstructs at least one reconstructed satellite state for at least one of the time periods using the received data; and at least one signal processor that uses the at least one reconstructed satellite state to acquire a satellite signal.

In accordance with another aspect of the invention, a method for determining a position of a client device is provided that includes the acts of: receiving historical state data for at least one satellite of a satellite-based positioning system; continuously predicting satellite states for future time periods using the historical state data; transferring data representative of the predicted satellite states to the client device via a first communication link; selectively reconstructing at least one reconstructed satellite state in the client device using the transferred data; and determining the position of the client device using the at least one reconstructed satellite state along with timing information of satellite data received on a second communication link.

In accordance with another aspect of the invention, a method for determining a position of a client device is provided that includes the acts of: receiving historical state data for at least one satellite of a satellite-based positioning system; continuously predicting satellite states for future time periods using the historical state data and transferring data representative of the predicted satellite states to the client device from a server; selectively reconstructing at least one reconstructed satellite states for at least one of the future time periods using the transferred data; and generating a future satellite state in the client device at a future time using the at least one reconstructed satellite state.

In accordance with another aspect of the invention, a method for determining a position of a client device is provided that includes the acts of: receiving historical trajectory data corresponding to satellites of a satellite-based positioning system over a first communication channel; generating predictions of future satellite trajectories for future time periods using the historical state data; generating satellite states using the predictions; acquiring satellite signals over a second communication channel using the generated satellite states; and determining the position of the client device using the generated satellite states and timing data in the acquired satellite signals.

In accordance with another aspect of the invention, a communications system is provided that includes: a first communication component that receives historical state data of satellites of a satellite-based positioning system; a first signal processing component that continuously generates predictions of future satellite states for future time periods using the historical state data; a second signal processing component that generates sets of parameters that represent the predicted satellite states, wherein each set of parameters includes information of predicted satellite states for at least one period of the future time periods; and a second communication component that transfers the generated sets of parameters to portable electronic devices that use the transferred sets of parameters to selectively reconstruct at least one reconstructed satellite state.

In accordance with yet another aspect of the invention, computer readable medium is provided including executable instructions which, when executed in a processing system, determine a position of a device by: receiving historical trajectory data corresponding to satellites of a satellite-based positioning system; generating predictions of future satellite trajectories for future time periods using the historical state data; reconstructing at least one reconstructed satellite state using the predicted future satellite trajectories; acquiring satellite signals using the at least one reconstructed satellite state; and determining the position using the at least one reconstructed satellite state and timing data from the acquired satellite signals.

BRIEF DESCRIPTION OF THE DRAWINGS

These figures are provided to assist in describing embodiments of the invention, and are not intended to be exclusive or limiting. In the figures, like reference numerals designate like elements.

DETAILED DESCRIPTION

Devices and methods are described for determining satellite ephemeris without the use of broadcast ephemeris data for extended time periods. A server or client device receives or collects historical state data of satellites of a satellite-based positioning system and generates predictions of future satellite trajectories for future time periods. If a server generates the predictions, the predictions are subsequently transferred to a client device. Upon selecting a time for a position determination, the client device selects predictions of satellite trajectories appropriate to that selected time. The client device generates navigation solutions for the future time using the predictions and uses the navigation solutions to acquire satellite signals appropriate to the current location of the client device. The client device determines and/or tracks its position using predicted satellite state information and measured timing information of the satellite signals.

In the following description, numerous specific details are introduced to provide a thorough understanding of, and enabling description for, embodiments of the positioning system. One skilled in the relevant art, however, will recognize that the positioning system can be practiced without one or more of the specific details, or with other components, systems, etc. In other instances, well-known structures or operations are not shown, or are not described in detail, to avoid obscuring aspects of the positioning system.

Figure 1:
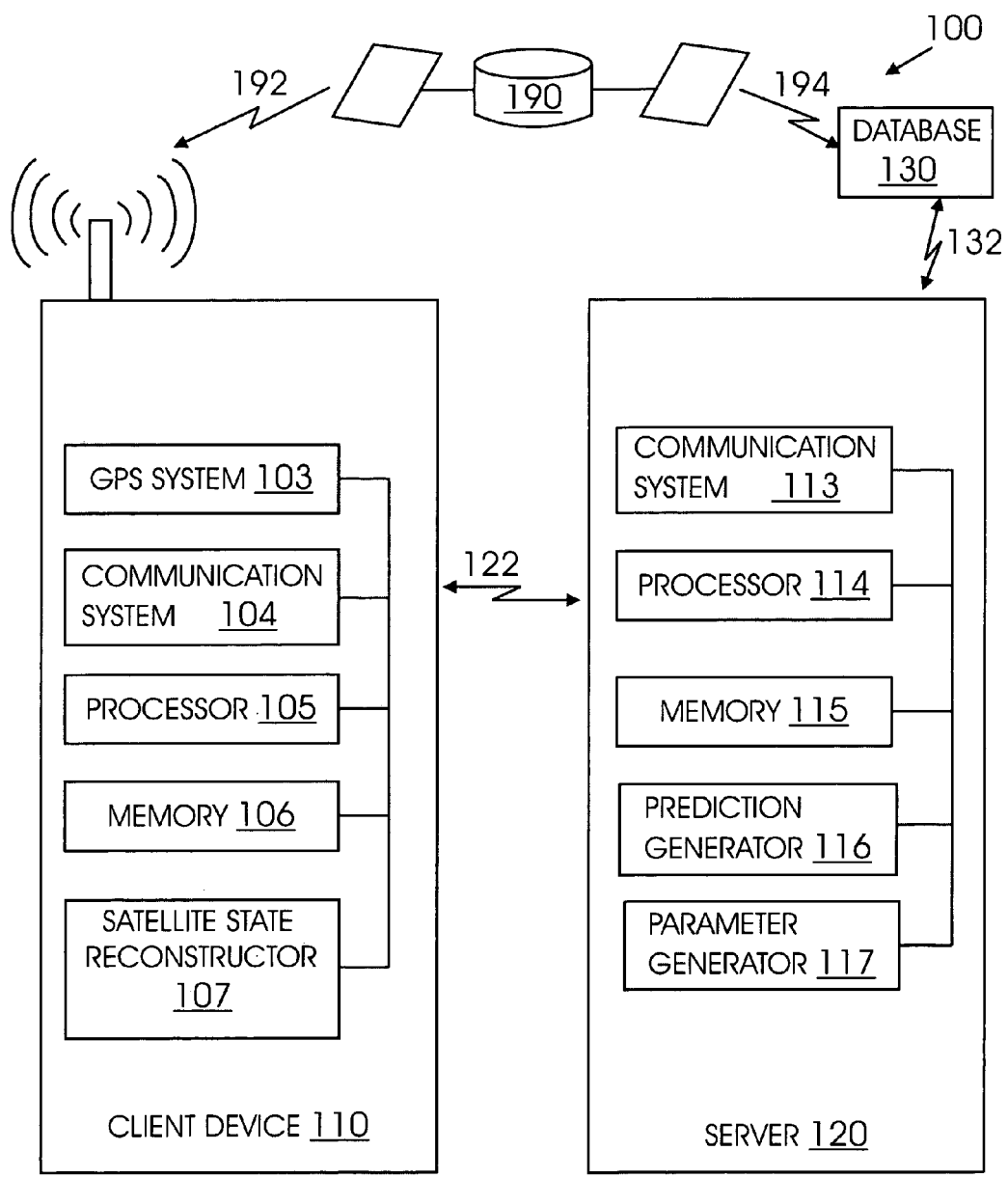
FIG. 1 is a block diagram of a system comprising client devices that provide position information without current ephemeris data, under an embodiment.

FIG. 1 is a block diagram of an exemplary system 100 comprising one or more client devices 110 that provide position information without the use of broadcast ephemeris data. The system 100 includes at least one client device 110 and at least one server system 120 or network of servers 120, referred to herein as server 120. The client devices 110 receive information from GPS satellites 190 in view via GPS signals 192. The client devices 110 and the servers 120 communicate via at least one communication channel or link 122 which comprises wireless and/or wired couplings 122. The servers 120 of an embodiment also communicate with one or more databases 130 to request and/or receive data on past GPS satellite trajectories via at least one channel or link 132. The link 132 between the servers 120 and the databases 130 includes at least one of wireless and/or wired couplings. The link 132 of alternative embodiments can include one or more networks (not shown) having one or more network types.

The client devices 110 of an embodiment include but are not limited to, portable communication devices, portable position tracking devices, cellular telephones, cellular telephones coupled to and/or integrated with position tracking devices, mobile electronic devices, mobile communication devices, personal computers (PCs), personal digital assistants (PDAs), and other processor-based devices. As one example, the client device 110 is a cellular telephone 110 and the server 120 is coupled to the cellular service provider's network; the communication link 122 is a wireless connection. As another example, the client device 110 is a PDA 110 and the server 120 is that of a GPS service provider; the communication link 122 is a wireless and/or wired connection using the Internet. These configurations are provided only as examples, and do not limit the embodiments described herein.

Generally, the server 120 of an embodiment continuously predicts states of all GPS satellites 190 over a predetermined period of arbitrary duration. The server 120, using historical information received from the database 130, may generate the predictions by fitting parameters to a satellite's force model. The satellite force model is derived for each satellite using past trajectory data of the satellite. Once parameters are found that fit the force model, the server 120 uses the fitted parameters in numerical integrations of the equations of satellite dynamical motion from which predicted satellite states are generated for future time periods. These predicted satellite states may also be denoted as satellite ephemeris.

It will be appreciated by those of ordinary skill in the arts that the term "ephemeris" is then being used in its strict sense. Although it is conventional in the GPS arts to refer to the transmission of Kepler parameters by the GPS satellites as "broadcast ephemeris," Kepler parameters are not "true" satellite ephemeris but instead are parameters derived from satellite ephemeris. Because the reference to the conventional transmission of Kepler parameters from GPS satellites as "broadcast ephemeris" is a firmly entrenched practice in the GPS arts, the results from the numerical integration by server 120 will be referred to as "predicted satellite states" to avoid confusion with parameters such as Kepler parameters that are merely derived from satellite ephemeris. In that regard, the prediction of satellite state information by client device 110 is also a prediction of "true" ephemeris. However, to distinguish this predicted information from parameters such as Kepler parameters, the predictions from client device 110 will be denoted as "reconstructed satellite state" information.

As will be explained further herein, this distinction becomes important because server 120 may compress or compact the predicted satellite state information into parameters such as Kepler parameters that are then transmitted over link 122 to client device 110. Alternatively, server 120 may send some or all of the predicted satellite state information itself to client device 110 over link 122 to client device 110. Should client device 110 receive predicted satellite state information, it may process this predicted state information to provide the desired reconstructed satellite state information. Similarly, if client device 110 receives "compacted state information" such as Kepler parameters, it may process this compacted state information to provide the desired reconstructed satellite state information. The type of information transmitted represents a tradeoff between the amount of information that must be transmitted versus the amount of processing client device 110 must perform to determine reconstructed satellite states using the transmitted information from server 120. In this fashion, a user may balance bandwidth demands over link 122 with processing demands in client device 110.

Referring again to database 130, the historical trajectory or state data of the database 130 includes mainly historical position state vectors of satellite trajectories and clock biases of satellites but can include other information. More specifically, the historical state data includes at least one of or some combination of satellite position state vectors, satellite velocity state vectors, satellite clock biases, and satellite clock rate errors. The database 130 can be a component of the server system 120, or can be a standalone server or system. Further, the database 130 can be that of an appropriate provider of such historical information. One example of a provider from which the historical satellite information is received is the International GPS Service (IGS). Alternatively, the historical satellite data is generated and provided by components of the server 120.

The processing of satellite data from database 130 by server 120 will now be further discussed. Server 120 includes a prediction generator 116 that predicts satellite states using the satellite data from database 130. These predicted satellite states span a future time period. As discussed previously, these predictions may take place by fitting parameters to a satellite's force model. The satellite force model is derived for each satellite using past trajectory data of the satellite. Once parameters are found that fit the force model, prediction generator 116 uses the fitted parameters in numerical integrations of differential equations of satellite dynamical motion from which predicted satellite states are generated periodically across a future period. The predicted satellite states include, but are not limited to, predictions of position state vectors of future satellite biases and drifts for the satellites. In general, it will be appreciated that the extent of the future period spanned by the predicted satellite states depends upon the allowable error in the resulting predicted satellite states. For example, if a radial error of +/−40 meters is acceptable, conventional numerical integrations of satellite dynamical motion may be used to provide predicted satellite states that span a period of seven calendar days. Indeed, in the following discussion, it will be assumed that the spanned period is seven calendar days. However, the present invention is not limited to this particular spanned period and includes periods of varying scope. Furthermore, the periods between predicted satellite states (which may also be denoted as "sub-periods") is also arbitrary. In the following discussion, it will be assumed to be 15 minutes. These predictions are made for all the operating GPS satellites, which at the time of filing numbered thirty-two. It will thus be appreciated that prediction generator 207 may generate a fairly substantial number of predicted satellite states: 7 days*32 satellites*24 hours/day*(4 fifteen minute periods)/hr equals 21,504 predicted satellite states. In one embodiment, server 120 could simply transmit all these predicted satellite states to client device 110. Because the predicted satellite states represent predictions of satellite ephemeris at fifteen minute intervals, client device 110 could determine reconstructed satellite states at an arbitrary time within the seven calendar day period by merely interpolating relevant predicted satellite states with respect to the arbitrary time. It will be appreciated, however, that such an embodiment places substantial bandwidth demands upon wireless link 122 as well as requiring substantial memory space within a memory 106 in client device 110. Accordingly, fewer predicted satellite states may be transmitted—for example, rather than 15 minute intervals, just one predicted satellite state spaced regularly across 24 hour sub-periods within the seven calendar period may be transmitted. Using relevant states from the resulting seven predicted satellite states that are transmitted, client device 110 could determine a reconstructed satellite state at an arbitrary time within the seven calendar day period. However, this generation must necessarily be more complicated than in the case of receiving all 21,504 predicted states. Indeed, such a generation may be performed using a numerical integration of a modified set of the differential equations of satellite motion discussed with respect to server 120. It will thus be appreciated that one form of "data compression" that may be implanted in system 100 involves the transmission of a subset of the predicted satellite states.

Another form of data compression to limit the bandwidth demands on wireless link 122 may be performed by converting the predicted states into parameters such as Kepler parameters. Accordingly, server 120 may include a parameter generator 117. Although other types of parameters such as Chebyshev approximations may be used, the following discussion will assume that the parameters generated by parameter generator 117 are Kepler parameters. Regardless of whether data compression is implemented, server 120 may include a communication system 113, a processor 114, and a memory 115. The server communication system 113 includes components that interface with any number of wired/wireless communication channels to support communication with the client device 110 and any other system servers as well as other communication devices. As an example, the communication system 113 includes components that provide at least one of cellular telephone communications and radio frequency (RF) communications using at least one of analog protocols and digital protocols, but other communication types/protocols can be supported as known in the art.

The server 120 can be a standalone device, part of a proprietary network (not shown), and/or part of a service provider's infrastructure (not shown), as appropriate, but is not so limited. As an example, where the client device 110 is a cellular telephone that includes a GPS system, the server 120 can be a component of the cellular telephone service provider's network or a standalone server that transfers data to the client device 110 via components of the service provider's network.

In operation, the communication system 113 of the server 120 receives the historical information from the database 130 via communication link 132. Alternative embodiments of the system 100 include servers 120 that generate and provide the historical information instead of the database 130. The server prediction generator 116 continuously predicts states of all GPS satellites 190 over a future time period using the historical information received from the database 130. In one embodiment, server prediction generator 116 generates the predictions by fitting parameters to a satellite's force model as derived from the past trajectory data of the satellite and then using these fitted parameters in numerical integration of the appropriate equations of satellite dynamical motion.

Depending upon whether data compression is used and the type of data compression implemented, the type of data transmitted over wireless link 122 varies accordingly. The data stream across wireless link 122 is transferred to the client device 110 using one or more transmissions, where the transmissions are via any number of protocols as appropriate to the transmission medium.

The client device 110 obtains the data stream from the server 120 in response to at least one of an appropriate request and/or from data broadcast by the server 120. Upon receiving the data stream, the client device 110 is not required to communicate further with the server 120 or any other source of ephemeris information. For example, if the data stream comprises Kepler parameters, the client device 110 selectively uses the received parameters to reconstruct the predicted satellite trajectories which are subsequently used to generate satellite acquisition information and/or navigation solutions in a manner consistent with the use of ephemeris data. Accurate position fixes are generated by the client device 110 using the predicted satellite trajectories that are valid for future time periods at least as long as one week, but the embodiment is not so limited. Use of the predicted satellite trajectory data by the client device 110, in addition to removing a dependence on broadcast ephemeris data, also results in relatively improved performance in low Signal-to-Noise Ratio (SNR) environments and interference prone environments and improved time-to-first-fix (TTFF). Regardless of how client device reconstructs or synthesizes a satellite state, such states may be denoted as "new" satellite states to distinguish them from the predicted satellite states generated by server 120.

The client device 110 of an embodiment comprises a number of systems including at least one of a GPS system 103, communication system 104, processor 105, memory 106, and satellite state reconstructor 107. The GPS system 103, communication system 104, memory 106, and satellite state reconstructor 107 of an embodiment run either autonomously or under control of the processor 105, but are not so limited. The GPS system 103 includes a receiver that receives information from GPS satellites 190 in view via the GPS signals 192. The information received by the client devices 110 via the GPS signals 192 includes a pseudorandom code along with ephemeris and almanac data, but is not so limited. The ephemeris and almanac data may not be demodulable if the SNR is too low. Advantageously, the present invention enables client device 110 to continue to determine its position using standard GPS processing techniques even though broadcast ephemeris data is not demodulable; the broadcast ephemeris is replaced by reconstructed satellite states provided by satellite state reconstructor 107.

The communication system 104 includes components that interface with any number of wired/wireless communication channels and use any number of communication protocols to support communications between the client device 110 and the server 120 as well as other communication devices. As an example, the communication system 104 includes components that provide at least one of cellular telephone communications and radio frequency (RF) communications using at least one of analog protocols and digital protocols, but other communication types/protocols are supported as known in the art.

The implementation of satellite state reconstructor 107 depends upon whether any of the discussed data compression is used. As discussed earlier, if all the predicted satellite states provided by server 120 are transmitted without any data compression, satellite state reconstructor could simply linearly interpolate relevant predicted satellite states with respect to an arbitrary time within the spanned time period. Alternatively, should just a few of the predicted satellite states be transmitted such as the once-per-day predicted satellite states discussed earlier, satellite state reconstructor could determine a reconstructed satellite state with respect to an arbitrary time within the spanned period by numerical integration of a modified set of the differential equations discussed with respect to server 120. As yet another alternative, Kepler parameters may be transmitted so that satellite state reconstructor 107 then uses the parameters to reconstruct the satellite states at appropriate times which are subsequently used to generate navigation solutions as described herein. The satellite state reconstructor 107 of an embodiment includes at least one of hardware, software, and firmware running under control of a dedicated processor and/or other processors of the client device 110.

The processor 105 includes any collection of computing components, devices and software operating together, as is known in the art. The processor 105 can also be components or subsystems within a larger computer system or network. The processor 105 can also be coupled among any number of components (not shown) known in the art, for example other buses, controllers, memory devices, and data input/output (I/O) devices, in any number of combinations. Further, functions of the processor 105 can be distributed across other components of the client device 110.

The communication links or channels 122, 132, 192, and 194 include at least one of wireless connections, wired connections, and trace connections. The communication links 122, 132, 192, and 194 also include couplings or connections to other systems as well as networks including local area networks (LANs), metropolitan area networks (MANs), wide area networks (WANs), proprietary networks, and proprietary or backend networks.

The client device 110 receives the data stream from the server 120 using the device communication system 104. The data stream is received in response to an appropriate electronic request from the client device 110 and/or from data broadcast by the server 120, but is not so limited. The client device 110 of some embodiments stores the received data in one or more memory areas 106 of the client device 110, but is not so limited. Alternative embodiments of the client device 110 do not store the received data. The device satellite state reconstructor 107 selectively uses the data stream to determine reconstructed satellite states. Various components of the client device 110 subsequently use the reconstructed satellite state(s) along with other satellite data received from the satellites 190 to generate navigation solutions using known GPS signal processing methods. Accurate position fixes can be generated by the client device 110 for a period at least as long as one week using information of the compact satellite parameters instead of broadcast ephemeris data.

Should parameter data compression be implemented, the parameters are represented over future time periods which include one or more consecutive sub-periods or sub-intervals of time that collectively cover a span of at least seven calendar days or one calendar week, but are not so limited. Each sub-period covers a pre-specified span of time, and the sub-periods can each cover spans of time that are the same or different lengths. The sub-periods of an embodiment each cover a span of four hours, but the sub-periods of alternative embodiments can cover more or less time.

In supporting position determination during lengthy periods of time in the future without use of broadcast ephemeris data, one or more data streams are transferred to the client devices 110, as described above. The data streams may include the Kepler parameters that represent satellite trajectories in compact form, and are stored in an area of device memory 106 upon receipt. In one embodiment, The Kepler parameters comprises sets of Kepler parameters, where each set includes the Kepler parameters that correspond to a sub-period of the spanned time period. Alternatively, a first set of Kepler parameters includes all parameters representative of the predicted satellite trajectories for a first sub-period, and each subsequent set of parameters includes difference information from which parameters of the predicted satellite states for the corresponding sub-period are calculated. The difference information is relative to the first set of parameters, but is not so limited.

The device satellite state reconstructor 107, in selectively using the parameters, selects the set of Kepler parameters that correspond to the sub-period that includes the time at which satellite state is required for acquisition and/or navigation. A reconstructed satellite state is then reconstructed using the selected set of Kepler parameters and navigation solutions are generated by using ranging information from the satellite signal.

The server 120 of various alternative embodiments can transfer the Kepler parameters in one or any other number of sets. Furthermore, the Kepler parameters can be used to generate predictions without first being stored. Moreover, in yet other alternative embodiments, all predictions can be generated (upon receipt or following receipt) for the entire span of the future time period and then the predictions can be stored in client device memory.

In one embodiment, the current curve fit interval for Kepler parameter sets is nominally four hours, and the period of time for which the model is valid is a function of the forces on the GPS satellites 190 and the quality of the curve fit using the Keplerian the gravitational field of the Earth; the gravitational field of the Moon; the gravitational field of the Sun; radiation pressure (sunlight absorbed/reflected from the satellite); thermal radiation from the satellite; outgassing from the satellite body; Earthshine (light reflected from the Earth); and the gravitational forces of Venus and Jupiter.

The devices and methods described herein provide for the generation of accurate navigation solutions for extended periods of time without broadcast ephemeris data through use of accurate predictions of future satellite states. The predictions are generated using an accurate satellite state and force model that is derived from data of past satellite states. The use of past satellite states to generate the model produces a more accurate model that better accounts for the forces acting on the satellites, as described above. Use of a higher accuracy model reduces the propagation errors introduced by a model of relatively lower accuracy. It also helps reduce the curve fit error associated with the quasi-Keplerian parameters for the satellite orbit used in the ephemeris information. Upon identifying parameters that fit the force model, predictions of satellite states at future times are generated using a high-fidelity satellite dynamical motion model.

Figure 2:
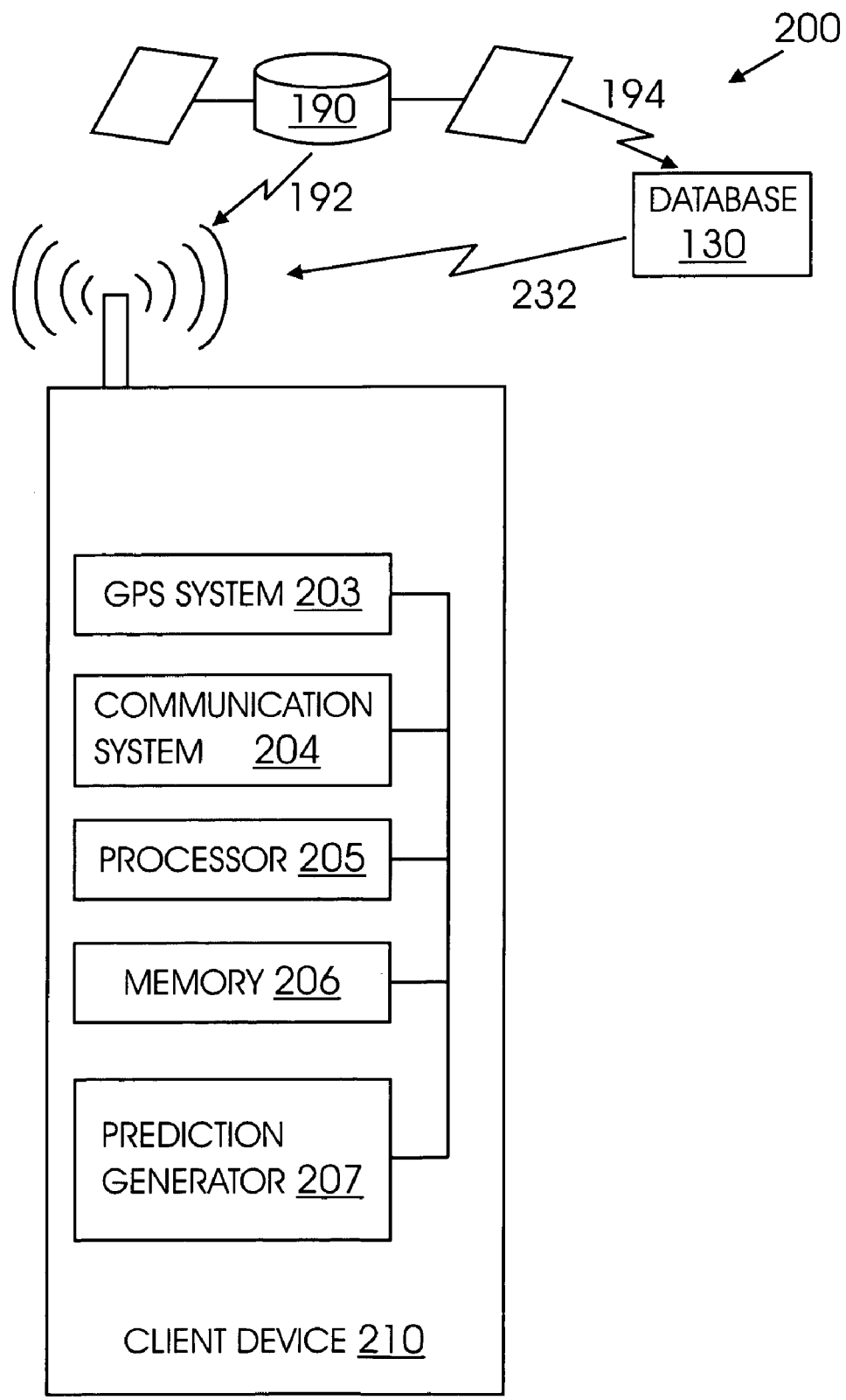
FIG. 2 is a block diagram of a system comprising client devices that provide position information without using ephemeris data, under an alternative embodiment.

The processing functions hosted on the server 120, as described above, can alternatively be hosted by the client device 110 of an alternative embodiment. FIG. 2 is a block diagram of a system 200 comprising client devices. 210 that provide position information without using current ephemeris data, under an alternative embodiment. The system 200 includes client devices 210 that receive information from GPS satellites 190 via GPS signals 192. The client devices 210 also communicate with one or more databases 130 to request and/or receive data on past GPS satellite trajectories via at least one link 232. The link 232 between the client devices 210 and the databases 130 includes at least one of wireless and/or wired couplings. The link 232 of alternative embodiments can include one or more networks (not shown) having one or more network types.

The client devices 210 of an embodiment comprises a number of systems including at least one of a GPS system 203, communication system 204, processor 205, memory 206, and prediction generator 207, all of which run either autonomously or under control of the processor. The GPS system 203 includes a receiver that receives information from GPS satellites 190 in view via the GPS signals 192, as described above. The communication system 204 includes components that interface with any number of wired/wireless communication channels to support communication between the client device 210 and the database 130 as well as other communication devices. As an example, the communication system 204 includes components that provide at least one of cellular telephone communications, radio frequency (RF) communications, analog communications, and digital communications, among others.

Components of the prediction generator 207 continuously predict states of all GPS satellites 190 over a future time period using the historical information received from the database 130. The prediction generator 207 generates the predictions by fitting parameters to a satellite's force model from the past trajectory data of the satellites 190 and then using these fitted parameters in numerical integration of the equations of satellite dynamical motion, but is not so limited. In an alternate embodiment, the client device 210 can locally compress the satellite predictions into a set of compact parameters. These parameters are locally stored. The satellite state vector will be later reconstructed from these locally stored parameters.

Figure 3:
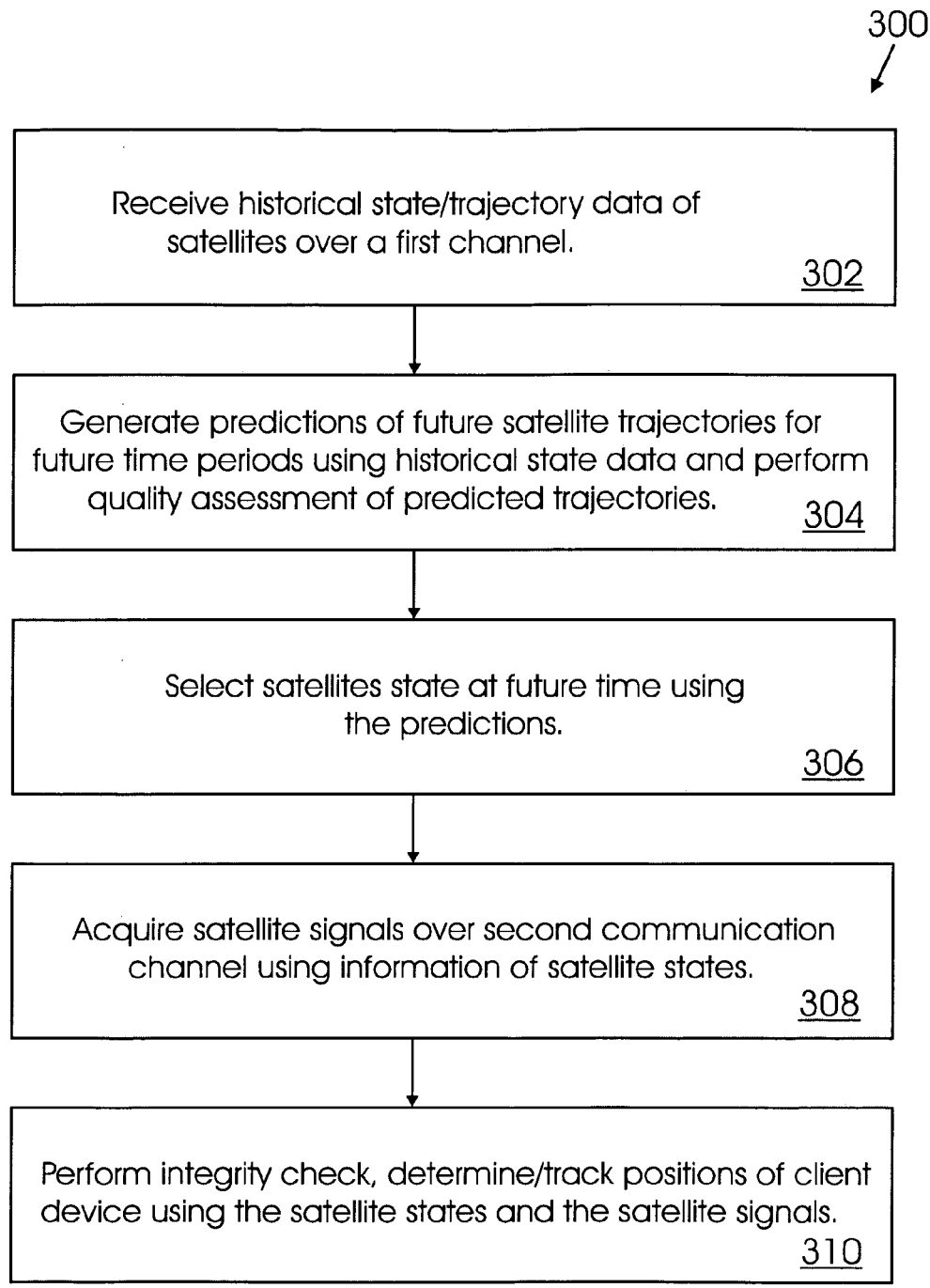
FIG. 3 is a flow diagram for determining position information without ephemeris data, under an embodiment.

The client device 210 automatically determines its position without use of broadcast ephemeris data for extended periods of time. In operation, the communication system 204 receives the historical information from the database 130 via communication link 232. The historical information is received in response to an appropriate request from the client device 210, from data broadcast by the database 130, and/or via a network connection with the database 130, but is not so limited. The prediction generator 207 continuously predicts states of all GPS satellites 190 over a future time period using the historical information. In an alternate embodiment, at predetermined times the prediction generator 207 can predict future states of all satellites, and stores the results as parameters. In another embodiment the parameters can be stored in a compact form. Various components of the client device 210 subsequently use the predicted satellite trajectories or the parameters to generate satellite state at appropriate time as required in a navigation solution. The predicted satellite trajectories are valid for a period of The systems and devices described above operate under one or more methods as described below. FIG. 3 is a flow diagram 300 for determining position information without broadcast ephemeris data, under an embodiment. In operation, a processor-based device receives or collects historical state or trajectory data (also referred to as historical data) that corresponds to the satellites of a satellite-based positioning system, at block 302. The processor-based device can be, for example, either of the server or the client device as described above, but is not so limited. The historical data is received over a first communication channel or link, for example a wired and/or wireless link to a data provider.

The server or client device, in response to receipt of the historical data, generates predictions of future satellite trajectories for future time periods using the historical data, and performs quality assessment of predicted trajectories, at block 304. When a server is used to generate the trajectory predictions, the predictions are subsequently transferred to a client device. The predictions are transferred in terms of parameters using one of a compressed or an uncompressed data stream, but are not so limited. The transfer of the predictions can be performed automatically by the server using one or more pre-specified intervals, or performed in response to an electronic request from the client device. As an example, a user of the client device can initiate an electronic request for the data transfer prior to a camping trip during which he/she anticipates needing the enhanced performance described herein. When the client device generates the predictions from the historical data, no transfer is necessary.

Upon selecting a future time for which a position determination is needed, the client device selects the predictions appropriate to the time at which satellite states are required for acquisition and/or for navigation, at block 306. The client device uses the satellite states selected at block 306 for acquisition of GPS satellite signals as appropriate to the current location and time of the client device, at block 308. The GPS satellite signals are acquired and received via a second communication channel, but are not so limited. The client device performs an integrity check, and determines and/or tracks its position using information of the satellite states and information of the satellite signals as appropriate to typical GPS signal processing in block 310.

Figure 4:
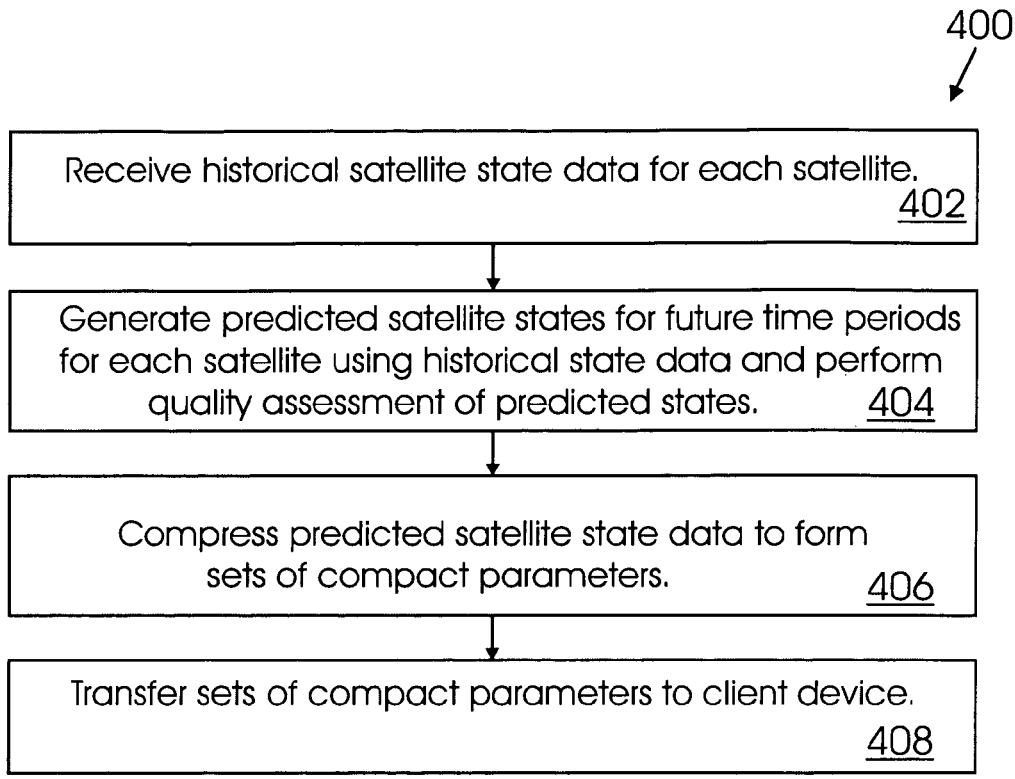
FIG. 4 is a flow diagram for generating information of predicted satellite states for use by a client device in determining position information without use of ephemeris data, under an embodiment.

Embodiments of the systems described above include one or more processor-based devices generating information of the predicted satellite states for use by client devices. FIG. 4 is a flow diagram 400 for generating information of predicted satellite states for use by a client device in determining position information without use of broadcast ephemeris data, under an embodiment. In operation, a processor-based device like the server or server system described above receives or collects historical state data for one or more satellites of a satellite-based positioning system, at block 402. Components of the server continuously predict satellite states for future time periods using the historical state data and perform quality assessment of predicted states, at block 404. The server compresses information of the predicted satellite states to form one or more sets of compact parameters, at block 406. The server subsequently transfers the sets of compact parameters to client devices, at block 408. Servers under a number of alternative embodiments may transfer the information of the predicted satellite states without compaction and/or compressing of the information, but are not so limited. Referring again to FIG. 1, it will be appreciated that regardless of the format of the data stream transmitted over wireless link 122, server 120 may compress this data stream using conventional data compression algorithms. Client device 110 may then de-compress the compressed data stream accordingly. For example, if all the predicted satellite states are transmitted, these predicted satellite states may be compressed using a conventional data compression algorithm. Alternatively, if Kepler parameters are transmitted, these Kepler parameters may be compressed using a conventional data compression algorithm.

Figure 5:
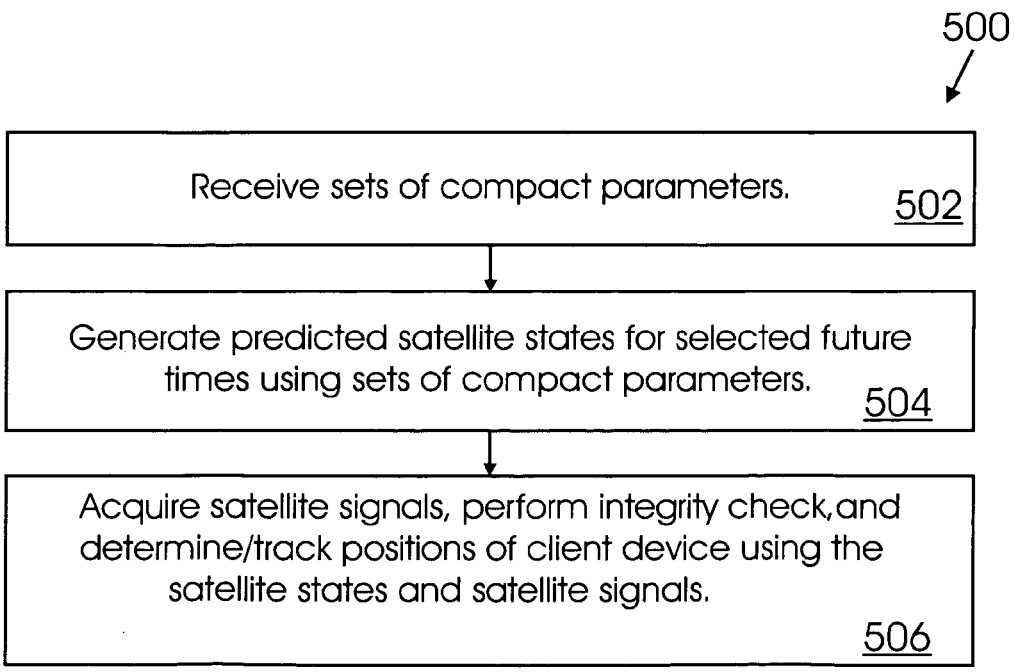
FIG. 5 is a flow diagram for generating predicted satellite states in a client device for use in determining position information without ephemeris data, under an embodiment.

Embodiments of the systems described above include processor-based client devices that use information of predictions about satellite state to support position determination by the device for extended periods of at least seven calendar days without using broadcast ephemeris data. FIG. 5 is a flow diagram 500 for generating predicted satellite states in a client device for use in determining position information without broadcast ephemeris data, under an embodiment. In operation, a processor-based client device receives at least one data stream, at block 502. The data stream includes one or more sets of compact parameters that represent information of predicted satellite states for future time periods. The data streams of alternative embodiments can include additional information.

The client device selectively reconstructs satellite states using the received sets of parameters, at block 504. The selective reconstruction of satellite states in alternative embodiments is performed in response to detecting an absence of current ephemeris data. In yet another alternative embodiment, the selective reconstruction is performed according to a mode in which the client device is operating. As an example, a client device operating in a pseudo-autonomous mode is configured so that broadcast ephemeris information is not collected even if available; therefore, selective regeneration of the reconstructed states is performed in response to operating in a mode in which ephemeris is not collected.

The client device uses the reconstructed satellite states for acquisition of GPS satellite signals as appropriate to the current location and time of the client device, at block 506. The GPS satellite signals are acquired and received via a second communication channel, but are not so limited. The client device performs integrity checks and determines and/or tracks its position using information of the satellite states and the acquired satellite signals as appropriate under GPS signal processing techniques.

The integrity/consistency checks include receiver autonomous integrity monitoring (RAIM), for example. Alternative embodiments, however, can perform different integrity/consistency checks or may exclude the integrity/consistency checks.

In order to simplify the integrity or consistency checks performed on reconstructed satellite vectors, the server or client device of the various embodiments herein makes use of information of the Notice Advisory to NAVSTAR Users (NANU) retrieved, for example, via a network connection like the Internet. The NANU information includes advance information as to scheduled satellite non-availability (for maintenance purposes) or planned satellite maneuvers. Use of this NANU information allows for the exclusion of satellites from the predictions for which planned future actions (maintenance and/or maneuvers) would adversely impact reliability of the predictions.

Aspects of the positioning system of an embodiment may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the positioning system of an embodiment include: microcontrollers with memory (such as electronically erasable programmable read only memory (EEPROM)), embedded microprocessors, firmware, software, etc. Furthermore, aspects of the positioning system of an embodiment may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, refer to this patent as a whole and not to any particular portions of this patent. When the word "or" is used in reference to a list of two or more items, that word covers all of the following interpretations of the word: any of the items in the list, all of the items in the list and any combination of the items in the list.

The above description of illustrated embodiments of the positioning system and positioning methods is not intended to be exhaustive or to limit the embodiments to the precise form disclosed. While specific embodiments of, and examples for, the positioning system are described herein for illustrative purposes, various equivalent modifications are possible within the scope of the embodiments, as those skilled in the relevant art will recognize. The teachings of the positioning system provided herein can be applied to other electronic systems, not only for the electronic systems described above.

The elements and acts of the various embodiments described above can be combined to provide further embodiments. These and other changes can be made to the positioning system of an embodiment in light of the above detailed description.

In general, in the following claims, the terms used should not be construed to limit the positioning system to the specific embodiments disclosed in the specification and the claims, but should be construed to include all electronic systems that operate under the claims to provide positioning information. Accordingly, the positioning system is not limited by the disclosure, but instead the scope of the positioning system is to be determined entirely by the claims.

While certain aspects of the positioning system are presented below in certain claim forms, the inventors contemplate the various aspects of the positioning system in any number of claim forms. For example, while only one aspect of the positioning system is recited as embodied in computer-readable medium, other aspects may likewise be embodied in computer-readable medium. Accordingly, the inventors reserve the right to add additional claims after filing the application to pursue such additional claim forms for other aspects of the positioning system.

What is claimed is:

1. A method for determining a position of a client device, comprising:

receiving historical state data for at least one satellite of a satellite-based positioning system;

continuously predicting satellite states for future time periods using the historical state data;

transferring data representative of the predicted satellite states to the client device via a first communication link;

selectively reconstructing at least one reconstructed satellite state in the client device using the transferred data; and determining the position of the client device using the at least one reconstructed satellite state along with timing information of satellite data received on a second communication link.

2. The method of claim 1, wherein the historical state data includes at least one of satellite position state vectors, satellite velocity state vectors, satellite clock biases, and satellite clock rate errors.

3. The method of claim 1, wherein the historical state data is received via at least one coupling with a database, wherein the historical state data is delivered to at least one server.

4. The method of claim 3, wherein the coupling includes at least one of a wired coupling, a wireless coupling, and a wired/wireless coupling to a ground-based network.

5. The method of claim 1, wherein continuously predicting satellite states includes predicting at least one of satellite position state vectors and satellite velocity state vectors of future satellite trajectories and future satellite clock biases and satellite clock rate errors for the satellites.

6. The method of claim 1, wherein the future time periods include one or more consecutive sub-periods with each sub-period covering a pre-specified span of time.

7. The method of claim 1, wherein the future time periods collectively cover a span of time having a length of at least seven calendar days.

8. The method of claim 1, wherein the future time periods include a plurality of time periods each having a length of at least four hours.

9. The method of claim 1, wherein transferring data representative of the predicted satellite states includes:

generating the data by compressing the predicted satellite states into sets of compressed parameters; and transferring the sets of compressed parameters to the client device using at least one of a single transmission and multiple transmissions.

10. The method of claim 9, wherein each set of compressed parameters corresponds to the predicted satellite states for one period of the future time periods.

11. The method of claim 10, wherein the period is approximately four hours in length.

12. The method of claim 9, wherein a first set of compressed parameters includes all parameters of the predicted satellite states for a first future time period, wherein a second set of compressed parameters includes difference information from which parameters of the predicted satellite states for a second future time period are calculated.

13. The method of claim 12, wherein the difference information is defined relative to the first set of compressed parameters.

14. The method of claim 1, wherein transferring data further comprises transferring data in response to a request signal received from the client device.

15. The method of claim 1, wherein transferring data further comprises transferring parameters using at least one broadcast message.

16. The method of claim 1, wherein the first communication link includes at least one of a wired coupling, a wireless coupling, and a wired/wireless coupling.

17. The method of claim 1, further comprising storing the received parameters in at least one memory area of the client device.

18. The method of claim 1, wherein the transferred data comprise Kepler parameters, and wherein selectively reconstructing the at least one reconstructed satellite state solving Kepler equations of motion using selected ones of the transferred Kepler parameters.

19. The method of claim 1, wherein the transferred data comprise a subset of the predicted satellite states, and wherein selectively reconstructing the at least one reconstructed satellite state further comprises:

retrieving the transferred predicted satellite states that correspond to at least one selected period of the future time periods from at least one memory area of the client device; and numerically integrating satellite dynamical equations of motion using the retrieved transferred predicted satellite states to provide the at least one reconstructed satellite state.

20. The method of claim 1, further comprising detecting an absence of ephemeris data from the satellites.

21. The method of claim 1, further comprising performing integrity monitoring in the device.

22. A method for determining a position of a client device, comprising:

receiving historical state data for at least one satellite of a satellite-based positioning system;

continuously predicting satellite states for future time periods using the historical state data and transferring parameters representative of the predicted satellite states to the client device from a server;

selectively reconstructing at least one reconstructed satellite state for at least one of the future time periods using the transferred parameters; and generating a future satellite state in the client device at a future time using the at least one reconstructed satellite state.

23. A method for determining a position of a client device, comprising:

receiving historical trajectory data corresponding to satellites of a satellite-based positioning system over a first communication channel;

generating predictions of future satellite trajectories for future time periods using the historical trajectory data;

generating satellite states using the predictions;

acquiring satellite signals over a second communication channel using the generated satellite states; and determining the position of the client device using the generated satellite states and timing data in the acquired satellite signals.

24. Computer readable medium including executable instructions which, when executed in a processing system, determine a position of a device by:

receiving historical trajectory data corresponding to satellites of a satellite-based positioning system;

generating predictions of future satellite trajectories for future time periods using the historical state data;

reconstructing at least one reconstructed satellite state using the predicted future satellite trajectories;

acquiring satellite signals using the at least one reconstructed satellite state; and determining the position using the at least one reconstructed satellite state and timing data from the acquired satellite signals.

* * * * *

(12) EX PARTE REEXAMINATION CERTIFICATE (7264th)
United States Patent
Garin et al.

(10) Number: US 7,142,157 C1
(45) Certificate Issued: Dec. 22, 2009

(54) DETERMINING POSITION WITHOUT USE OF BROADCAST EPHEMERIS INFORMATION

(75) Inventors: Lionel J. Garin, Palo Alto, CA (US); Makarand S. Phatak, Sunnyvale, CA (US)

(73) Assignee: SIRF Technology, Inc., San Jose, CA (US)

Reexamination Request:
No. 90/010,258, Aug. 27, 2008

Reexamination Certificate for:
Patent No.: 7,142,157
Issued: Nov. 28, 2006
Appl. No.: 10/941,251
Filed: Sep. 14, 2004

(51) Int. Cl.
*H04B 7/185* (2006.01)
*G01S 5/02* (2006.01)

(52) U.S. Cl. .............. 342/357.15; 342/357.06
(58) Field of Classification Search .......... None
See application file for complete search history.

(56) References Cited
U.S. PATENT DOCUMENTS 6,438,382 B1 8/2002 Boesch et al.
6,560,534 B2 5/2003 Abraham et al.

OTHER PUBLICATIONS

Dye, Steven M. and Baylin, Dr. Frank, "Mobile Positioning," published Nov. 21, 1999.
Hoffmann–Wallenhof, B. et al., "GPS: Theory and Practice," published 1993.
Kaplan, Elliot D., et al., "Understanding GPS: Principles and Applications," published Feb. 1996.

*Primary Examiner*—Joseph A. Kaufman

(57) ABSTRACT

Devices and methods are described for determining position information without broadcast ephemeris data for extended time periods. A server or client device receives or collects historical state data of satellites of a satellite-based positioning system and generates predictions of future satellite trajectories for future time periods. When a server generates the predictions, the predictions are subsequently transferred to a client device. The client device selects predictions appropriate to time of interest. The time can be any time during a period of at least seven calendar days. The client device reconstructs satellite states using information on the predictions and uses the reconstructed satellite states to acquire satellite signals as appropriate to the current location and time of the client device. The client device determines and/or tracks its position using information of the satellite states and timing information of the satellite signals.

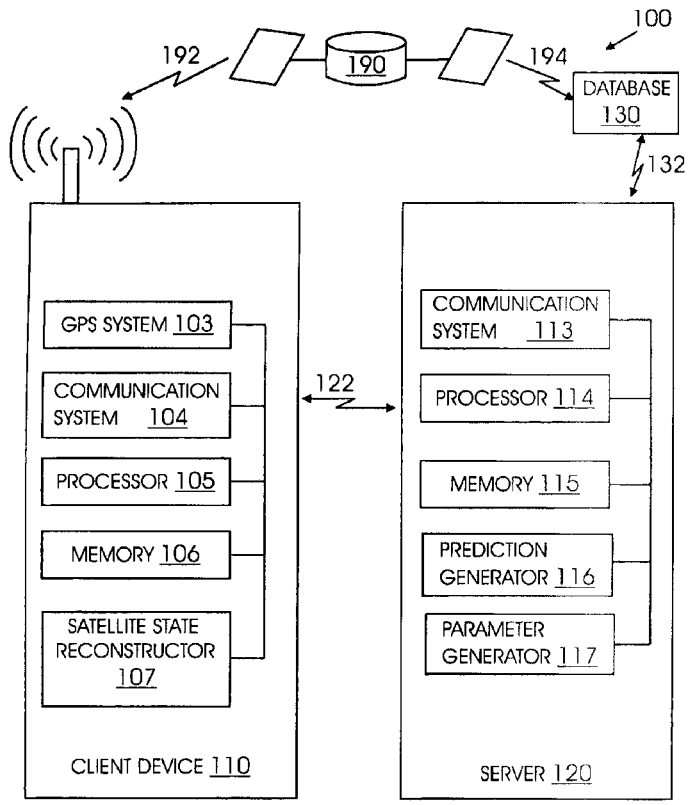

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–17 and 19–24 is confirmed.

Claim 18 is determined to be patentable as amended.

18. The method of claim 1, wherein the transferred data comprise Kepler parameters, and wherein selectively reconstructing the at least one reconstructed satellite state *includes* solving Kepler equations of motion using selected ones of the transferred Kepler parameters.

\* \* \* \* \*